US012443779B2

(12) United States Patent
Tang et al.

(10) Patent No.: US 12,443,779 B2
(45) Date of Patent: Oct. 14, 2025

(54) SOFT MEASUREMENT METHOD FOR DIOXIN EMISSION OF GRATE FURNACE MSWI PROCESS BASED ON SIMPLIFIED DEEP FOREST REGRESSION OF RESIDUAL FITTING MECHANISM

(71) Applicant: Beijing University of Technology, Beijing (CN)

(72) Inventors: Jian Tang, Beijing (CN); Heng Xia, Beijing (CN); Canlin Cui, Beijing (CN); Junfei Qiao, Beijing (CN)

( * ) Notice: Subject to any disclaimer, the term of this patent is extended or adjusted under 35 U.S.C. 154(b) by 0 days.

(21) Appl. No.: 18/727,294

(22) PCT Filed: Apr. 26, 2023

(86) PCT No.: PCT/CN2023/090771
§ 371 (c)(1),
(2) Date: Jul. 8, 2024

(87) PCT Pub. No.: WO2023/165635
PCT Pub. Date: Sep. 7, 2023

(65) Prior Publication Data
US 2024/0419872 A1    Dec. 19, 2024

(30) Foreign Application Priority Data
Mar. 4, 2022    (CN) .......................... 202210218420.1

(51) Int. Cl.
*G06F 30/27*    (2020.01)
*G06F 111/10*    (2020.01)

(52) U.S. Cl.
CPC .......... *G06F 30/27* (2020.01); *G06F 2111/10* (2020.01)

(58) Field of Classification Search
CPC ...... G06F 30/27; G06F 30/33; G06F 30/3308; G06F 30/3323; G06F 30/337; G06F 30/373; G06F 2111/10
(Continued)

(56) References Cited

U.S. PATENT DOCUMENTS

| | | | |
|---|---|---|---|
| 2008/0133434 A1 | 6/2008 | Asar et al. | |
| 2023/0080873 A1* | 3/2023 | Janka | G06F 30/27 |
| | | | 703/7 |
| 2023/0281363 A1* | 9/2023 | Phan | G06F 30/20 |
| | | | 703/1 |

FOREIGN PATENT DOCUMENTS

| | | |
|---|---|---|
| CN | 108549792 A | 9/2018 |
| CN | 109960873 A | 7/2019 |
| CN | 114564894 A | 5/2022 |

OTHER PUBLICATIONS

Heng Xia , etc. "Soft Measuring Method of Dioxin Emission Concentration for MSWI Process Based on RF and GBDT" 2020 Chinese Control and Decision Conference (CCDC), Aug. 11, 2020, Full specification.

(Continued)

*Primary Examiner* — Paul Dinh
(74) *Attorney, Agent, or Firm* — Shen Huang

(57) ABSTRACT

The invention provides a soft measurement method for dioxin emission of grate furnace MSWI process based on simplified deep forest regression of residual fitting mechanism. The highly toxic pollutant dioxin (DXN) generated in the solid waste incineration process is a key environmental index which must be subjected to control. The rapid and accurate soft measurement of the DXN emission concentration is an urgent affair for reducing the emission control of the pollutants. The method comprises the following steps: firstly, carrying out feature selection on a high-dimensional process variable by adopting mutual information and sig- (Continued)

nificance test; then, constructing a simplified deep forest regression (SDFR) algorithm to learn a nonlinear relationship between the selected process variable and the DXN emission concentration; and finally, designing a gradient enhancement strategy based on a residual error fitting (REF) mechanism to improve the generalization performance of a layer-by-layer learning process. The method is superior to other methods in the aspects of prediction precision and time consumption.

1 Claim, 2 Drawing Sheets

(58) Field of Classification Search
USPC .............................................................. 703/2
See application file for complete search history.

(56) References Cited

OTHER PUBLICATIONS

Qiao Junfei , etc. Soft measurement of dioxin emission concentration in solid waste incineration process based on multi-layer feature selection, Information and Control, vol. 50, Issue 1, Feb. 3, 2021 Full specification.

\* cited by examiner

SOFT MEASUREMENT METHOD FOR DIOXIN EMISSION OF GRATE FURNACE MSWI PROCESS BASED ON SIMPLIFIED DEEP FOREST REGRESSION OF RESIDUAL FITTING MECHANISM

TECHNICAL FIELD

The invention belongs to the field of solid waste incineration.

BACKGROUND

Municipal solid waste (MSW) treatment aims to achieve harmlessness, reduction and resource utilization, of which MSW incineration (MSWI) is currently the main method. However, MSWI process is also one of the main industrial processes currently emitting dioxins (DXN), a highly toxic organic pollutant, accounting for approximately 9% of total emissions. MSWI mainly uses technologies such as grate furnaces, fluidized beds and rotary kilns, among which grate furnace technology accounts for the largest proportion. The optimized operation of the MSWI process based on the grate furnace has an important contribution to the reduction of DXN emissions. Therefore, it is necessary to conduct high-precision real-time detection of DXN emission concentration.

Data-driven soft measurement technology can effectively solve the above problems, that is, using machine learning or deep learning methods to characterize the correlation between easily measurable process variables and DXN emission concentrations. This usually requires determining a mapping function to predict DXN emission concentrations. For example, genetic programming is combined with neural network (NN) to model DXN emissions, but it is not suitable for different types of incineration plants; the design is based on back-propagation NN (BPNN).), but its portability is not good, and BPNN has serious over-fitting problems when facing small sample problems; it adopts selective integration and evaluation variable projection importance strategies, and uses support vector machines and The nuclear latent structure mapping algorithm selects valuable process variables to construct the DXN soft sensor model, but it cannot represent depth features.

Based on 12 years of DXN data of an 800-ton grate furnace, a simplified deep forest regression (SDFR) method (SDFR-ref) with high accuracy and short time-consuming residual fitting mechanism was proposed. The main innovations of this article include: using decision trees to replace complex forest algorithms, thereby reducing the size of the deep forest ensemble model; using a residual fitting strategy with learning factors between cascade layers to give the model higher predictive performance; Mutual information (MI) and significance test (ST) are used for feature selection to simplify the input of the soft sensor model. In China incineration is the main MSW treatment method, and its typical process is shown in FIG. 1.

As shown in FIG. 1, the MSWI process flow based on the grate furnace includes six stages: solid waste storage and transportation, solid waste incineration, waste heat boiler, steam power generation, flue gas purification and flue gas emission. At present, MSWI factories are mainly concentrated in coastal areas, and more than 90% of them use grate furnaces. The grate-type MSWI process has the advantages of large daily processing capacity, stable operation, and low DXN emission concentration. The detection of DXN emission concentration in this article is aimed at the "smoke G3" position in the flue gas emission stage.

The MSWI plant studied in this article was ignited and put into operation in 2009.

From 2009 to 2013, the emission level of DXN was not higher than China's environmental emission standard (GB18485 2001), which is Ing I-TEQ/Nm$^3$ (oxygen content is 11%). Correspondingly, the number of DXN detections increased year by year, and finally stabilized at 4 times/year. Since 2014, my country has revised the emission limit of DXN (updated from Ing I-TEQ/Nm$^3$ to 0.1 ng I-TEQ/Nm$^3$). Obviously, increasingly stringent emission restrictions have led to a gradual increase in the number of DXN tests by enterprises and governments, and the operating costs of enterprises have also increased accordingly.

SUMMARY

The invention aims to explore how to use MSWI process data and limited DXN detection data to establish a DXN soft measurement model to provide key indicator data for MSWI companies' for their DXN emission reduction optimization control and cost reduction.

The invention proposes a modeling strategy based on feature selection and SDFR-ref. The structure is shown in FIG. 2.

As can be seen from FIG. 2, the proposed modeling strategy includes a feature selection module based on MI and ST and a SDFR module based on the residual fitting mechanism. Feature selection module selects the corresponding features by calculating the MI value and ST value of each feature; for SDFR module, Layer-k represents the k-th layer model, $\hat{y}_1^{Regvoc}$ represents the output vector of the first layer model, $v_1^{Augfea}$ represents the augmented regression vector of the second layer input, $\bar{y}_k^{Regvoc}$ represents the average value of $\hat{y}_k^{Regvoc}$, $\alpha$ is the remaining learning rate between each layer; x and $X^{Xsel}$ respectively represents the process data before and after feature selection; y, $\hat{y}$ and e are the true value, predicted value and prediction error respectively.

In addition, $\{\delta_{MI}, \delta_{SL}, \theta, T, \alpha, K\}$ represents the learning parameter set of the proposed SDFR-ref, where: $\delta_{MI}$ represents the threshold of MI, $\delta_{SL}$ represents the threshold of significance level, and $\theta$ represents the minimum sample in the leaf node number, T represents the number of decision trees in each layer of the model, a is the learning rate in the gradient boosting process, and K represents the number of layers. The globally optimized selection of these learning parameters can improve the synergy between different modules, thereby improving the overall performance of the model. Therefore, the proposed modeling strategy can be formulated as solving the following optimization problem:

$$\min RMSE(F^{SDFR-ref}(\cdot)) = \sqrt{\frac{1}{N}\sum_{n=1}^{N}\left(\left(\frac{1}{N}\sum_{n=1}^{N}y_n + \alpha\frac{1}{T}\sum_{k=1}^{K}\sum_{t=1}^{T}[c_{1,i}^{CART}, \ldots, c_{T,i}^{CART}]I_{R^M \times N}(X^{Xsel})\right) - y_n\right)^2} \quad (1)$$

$$s.t. \begin{cases} X^{Xsel} = f_{FeaSel}(D, \delta_{MI}, \delta_{SL}) \\ 0 < \alpha \leq 2 \\ 1 \leq T \leq 500 \\ 1 \leq \theta \leq N \\ 1 \leq K \leq 20 \\ 0 \leq \delta_{MI} \leq 1 \\ 0 \leq \delta_{SL} \leq 1 \end{cases}$$

Among them, $F^{SDFR-ref}(\bullet)$ represents the SDFR-ref model; $f_{FeaSel}(\bullet)$ represents the nonlinear feature selection algorithm proposed in this article; N represents the number of modeling samples; $y_n$ represents the n-th true value; $c_{1,l}^{CART}$ represents predicted value of l-th leaf node of first CART, $C_{T,l}^{CART}$ represents the predicted value of the l-th leaf node of T-th CART; $D=\{X, y|X \in R^{N \times M}, y \in R^{N \times 1}\}$ represents the original modeling data, which is also represents the input of the feature selection algorithm, M is the number of original features; $I_{R^{M \times N}}(X^{Xsel})$ is the indicator function, when $\bar{X}^{Xsel} \in R^{M \times N}$, $I_{R^{M \times N}}(X^{sel})=1$, when $X^{Xsel} \in R^{M \times N}$, $I_{R^{M \times N}}(X^{Xsel})=0$.

4.1 Feature Selection Based on MI and ST

MI and ST are used to calculate the information correlation between the original features (process variables) DXN values, and achieve the best selection of features through preset thresholds.

For the input data set, the nonlinear feature selection algorithm $f_{FeaSel}(\bullet)$ proposed in the invention is defined as follows:

$$D^{Sel} = f_{FeaSel}(D, \delta_{MI}, \delta_{SL}) \qquad (2)$$

Among them, $D^{Sel}=\{X^{Sel}, y|X \in R^{N \times M^{Sel}}, y \in R^{N \times 1}\}$ respectively represent the output of the proposed feature selection algorithm, and $M^{Sel}$ is the number of selected features.

In fact, MI does not need to assume the potential joint distribution of the data. MI provides an information quantification measure of the degree of statistical dependence between random variables, and estimates the degree of interdependence between two random variables to express shared information. The calculation process is as follows:

$$I_i^{MI}(x_i, y) = \sum_{x_{n,i}} \sum_{y_n} p(x_{n,i}, y_n) \log_2 \frac{p(x_{n,i}, y_n)}{p(x_{n,i}), p(y_n)} \qquad (3)$$

Among them, $x_i$ is the i-th eigenvector of x, $x_{n,i}$ is the n-th value of the i-th eigenvector, y represents the joint probability density; $p(x_{n,i})$ and $p(y_n)$ represent the marginal probability density of $x_{n,i}$ and $y_n$.

If the MI value of a feature is greater than the threshold $\delta_{MI}$, it is regarded as an important feature constituting the preliminary feature set $X^{MI}$. Furthermore, ST is used to analyze the correlation between the selected features based on MI and remove collinear features.

The Pearson coefficient value PCoe between the selected features $x_i^{MI}$ and $x_j^{MI}$ is calculated as follows:

$$PCoe = \frac{\sum_{n=1}^{N}(x_{n,i}^{MI} - \bar{x}_i^{MI})(x_{n,j}^{MI} - \bar{x}_j^{MI})}{\left\{\sum_{n=1}^{N}(x_{n,j}^{MI} - \bar{x}_i^{MI})^2 \sum_{n=1}^{N}(x_{n,j}^{MI} - \bar{x}_j^{MI})^2\right\}^{1/2}} \qquad (4)$$

Among them, $\bar{x}_i^{MI}$ and $\bar{x}_j^{MI}$ represent the average value of $x_i^{MI}$ and $x_j^{MI}$ respectively, $x_{n,i}^{MI}$ and $x_{n,j}^{MI}$ represent the n-th value of $x_i^{MI}$ and $x_j^{MI}$. Z-test is used to calculate the $Z_{test}$ value between features $x_i^{MI}$ and $x_j^{MI}$:

$$z_{test} = \frac{\bar{x}_i^{MI} - \bar{x}_j^{MI}}{\sqrt{S_i^2/N_i + S_j^2/N_j}} \qquad (5)$$

Among them, $S_i$ and $S_j$ represent the standard deviation of $x_i^{MI}$ and $x_j^{MI}$; $N_i$ and $N_j$ represent the number of samples of $x_i^{MI}$ and $x_j^{MI}$.

Furthermore, the p-value is obtained by looking up the $Z_{test}$ value in the table. At this point, we assume in $H_0$ that there is no linear relationship between the i-th and j-th features, and the Pearson coefficient PCoe is regarded as the alternative hypothesis $H_1$. Based on the comparison of p-value and significance level $\delta_{SL}$, the final selected $X^{Xsel}$ including the preferred features is determined. The criteria are expressed as follows:

$$\begin{cases} \text{Accept } H_1 \text{ (linearly dependent)}, & p\text{-value} < \delta_{SL} \\ \text{reject } H_0 \text{ (linearly independent)} \\ \text{Accept } H_0 \text{ (linearly independent)}, & p\text{-value} > \delta_{SL} \\ \text{reject } H_1 \text{ (linearly dependent)} \end{cases} \qquad (6)$$

Based on the above assumptions, the collinear features selected by MI are removed, thereby reducing the impact of data noise on the training model.

4.2 SDFR (SDFR-Ref) Based on Residual Fitting Mechanism 4.2.1 First Layer Implementation The training set after feature selection is recorded as $D^{Sel}$. The SDFR algorithm replaces the forest algorithm in the original DFR with a decision tree, that is, CART. Each layer contains multiple decision trees, and the tree nodes are divided using the squared error minimization criterion. The minimum loss function of this process is expressed as follows:

$$Split^{CART} = \min\left[\sum_{x_i^{Xsel} \in R_{Left}} \left(y_{Left} - c_{Left}^{CART}\right)^2 + \sum_{x_i^{Xsel} \in R_{Right}} \left(y_{Right} - c_{Right}^{CART}\right)^2\right] \qquad (7)$$

Among them, $c_{Left}^{CART}$ and $c_{Right}^{CART}$ are the outputs of $R_{Left}$ and $R_{Right}$ nodes respectively; $y_{Left}$ and $y_{Right}$ represent the true values in $R_{Left}$ and $R_{Right}$ nodes respectively.

Specifically, the nodes are determined in the following way:

$$\begin{cases} R_{Left}(j, s) = \{x^{Sel} | x_j^{Sel} \leq s\} \\ R_{Right}(j, s) = \{x^{Sel} | x_j^{Sel} > s\} \end{cases} \qquad (8)$$

Among them, j and s represent segmentation features and segmentation values respectively; $x_j^{Sel}$ is the j-th eigenvalue of the selected feature $x^{Sel}$. Therefore, CART can be expressed as:

$$h_1^{CART}(x^{Sel}) = \sum_{l=1}^{L} c_l^{CART} I_{R_l^{CART}}(x^{Sel}) \qquad (9)$$

Among them, L represents the number of CART leaf nodes, $c_l^{CART}$ represents the output of the l-th leaf node of CART, and $I_{R_l^{CART}}(x^{Sel})$ is the indicator function, when $x^{Sel} \in R_l^{CART}$, $I_{R_l}^{CART}(x^{Sel})=1$, when $x^{Sel} \notin R_l^{CART}$, $I_{R_l}^{CART}(x^{Sel})=0$.

The first-level model containing multiple CARTs is represented as follows:

$$f_1^{SDFR}(x^{Sel}) = \frac{1}{T}\sum_{t=1}^{T} h_{1,t}^{CART}(\cdot) \tag{10}$$

Among them, $f_1^{SDFR}(\cdot)$ represents the first layer model in SDFR, T represents the number of CARTs in each layer model, $h_{1,t}^{CART}(\cdot)$ represents the t-th CART model in layer 1.

Furthermore, the first-layer regression vector $\hat{y}_1^{Regvec}$ from the first-layer model $f_1^{SDFR}(\cdot)$ is expressed as follows:

$$\hat{y}_1^{Regvec} = [h_{1,1}^{CART}(\cdot), \ldots, h_{1,T}^{CART}(\cdot)] = [c_{1,l}^{CART}, \ldots, c_{T,l}^{CART}] \tag{11}$$

Among them, $c_{1,l}^{CART}$ represents the predicted value of the l-th leaf node of the first CART, represents the predicted value of the l-th leaf node of the T-th CART.

The augmented regression vector $V_1^{Augfea}$ is obtained by merging the layer regression vectors $\hat{y}_1^{Regvec}$ and is expressed as follows:

$$v_1^{Augfea} = f_{FeaCom}^{1}(\hat{y}_1^{Regvec}, x^{Sel}) \tag{12}$$

Among them, $f_{FeaCom}^{1}(\cdot)$ represents the eigenvector combination function.

$v_1^{Augfea}$ is then used as the feature input for the next layer. In the invention, the DXN true value is no longer used in subsequent cascade modules, but the new true value is recalculated through the gradient boosting strategy. Therefore, the invention uses the following formula to calculate the loss function of the squared error:

$$L_1^{SDFR}(y_n^{(1)}, f_1^{SDFR}(\cdot)_n) = \frac{1}{2}\sum_{i=1}^{N}(y_n^{(1)} - f_1^{SDFR}(\cdot)_n)^2 \tag{13}$$

Among them, $L_1^{SDFR}(\cdot)$ represents the squared error loss function in SDFR-ref; $y_n^{(1)}$ represents the n-th true value of the first layer training set.

The loss function $L_1^{SDFR}$ is further used to calculate the gradient direction as shown below.

$$\sigma_{1,n}^{SDFR} = -\left[\frac{\partial L(y_n^{(1)}, f_1^{SDFR}(\cdot))}{\partial f_1^{SDFR}(\cdot)}\right]_{f_1^{SDFR}(\cdot) = f_0^{SDFR}(\cdot)} \tag{14}$$

Among them, $\sigma_{1,n}^{SDFR}$ is the gradient of the nth true value of layer 1; $f_0^{SDFR}(\cdot)$ represents the arithmetic mean of the initial true value, that is $$f_0^{SDFR}(\cdot) = \frac{1}{N}\sum_{n=1}^{N} y_n,$$

$y_n$ represents the n-th true value.

Then, the objective function is:

$$f_1^{SDFR}(x^{Sel}) = f_0^{SDFR}(\cdot) + \alpha\sum_{t=1}^{T}[c_{1,l}^{CART}, \ldots, c_{T,l}^{CART}]I_R(x^{Sel}) \tag{15}$$

Among them, $f_1^{SDFR}(\cdot)$ is the first layer model; $\alpha$ represents the learning rate; $I_R(x^{Sel})$ represents when $x^{Sel} \in R$, $I_R(x^{Sel})=1$, when $x^{Sel} \in R$, $I_R(x^{Sel})=0$.

Therefore, the true value of the second level is:

$$y_2 = y - f_0^{SDFR}(\cdot) - \alpha f_1^{SDFR}(\cdot) = y_1 - \alpha f_1^{SDFR}(\cdot) = y_1 - \alpha \overline{\hat{y}}_1^{Regvec} \tag{16}$$

Among them, $y_1$ is the true value of the first layer model, that is, $y_1=y$, y is the true value vector of DXN; $\overline{\hat{y}}_1^{Regvec}$ represents the mean value of the first layer regression vector.

4.2.2 k-th Layer Implementation

The training set of the k-th layer based on the augmented regression vector of the (k−1)-th layer is expressed as $D_k^{Sel} = \{\{v_{(k-1),n}^{Augfea}\}_{n=1}^{N}, y_k\}$, $v_{(k-1)}^{Augfea}$ is the augmented regression vector of the (k−1)-th layer, and $y_k$ is the k-th true value.

First, establish the k-th level decision tree $h_k^{CART}(\cdot)$ according to formulas (7) and (8). The k-th level model is expressed as follows:

$$f_k^{SDFR}(v_{(k-1),i}^{Augfea}) = \frac{1}{T}\sum_{t=1}^{T} h_{k,t}^{CART}(\cdot) \tag{17}$$

Among them, $f_k^{SDFR}(\cdot)$ represents the k-th layer model, and $h_{k,t}^{CART}(\cdot)$ represents the k-th layer of the t-th CART model.

Then, the augmented regression vector $v_k^{Augfea}$ of the k-th layer is expressed as follows:

$$v_k^{Augfea} = f_{FeaCom}^{k}(\hat{y}_1^{Regvec}, x^{Sel}) \tag{18}$$

Among them, $\hat{y}_k^{Regvec}$ represents the regression vector of the k-th layer, that is, $\hat{y}_k^{Regvec}=[h_{k,1}^{CART}(\cdot), \ldots, h_{k,T}^{CART}(\cdot)]$.

Then, calculate the gradient $\sigma_k^{SDFR}$ according to formulas (12) and (13). The true value of (k+1)-th layer is expressed as follows:

$$y_{k+1} = y_1 - \alpha\left(\overline{\hat{y}}_1^{Regvec} + \ldots + \overline{\hat{y}}_k^{Regvec}\right) \tag{19}$$

4.2.3 K-th Layer Implementation

The K-th layer is the last layer of the SDFR-ref training process, that is, the preset maximum number of layers, and its training set is $D_K^{Sel} = \{\{v_{(K-1),n}^{Augfea}\}_{n=1}^{N}, y_K\}$.

First, build a decision tree model $h_K^{CART}(\cdot)$ through the training set $D_K^{Sel}$ and further obtain the K-th layer model $f_K^{SDFR}(\cdot)$. Then, calculate the K-th layer regression vector $\hat{y}_K^{Regvec}$ according to the input augmented regression vector $v_{(K-1)}^{Augfea}$, which is expressed as follows:

$$\hat{y}_K^{Regvec} = [h_{K,1}^{CART}(\cdot), \ldots, h_{K,T}^{CART}(\cdot)] \tag{20}$$

Among them, $h_{k,1}^{CART}(\cdot)$ represents the first CART model of the K-th layer, $h_{K,T}^{CART}(\cdot)$ represents the T-th CART model of the K-th layer.

Finally, the output value after gradient boosting with learning rate α is:

$$y_k = y_1 - \alpha \sum_{k=1}^{(K-1)} \bar{\hat{y}}_k^{Regvec} \tag{21}$$

Among them, $\bar{\hat{y}}_k^{Regvec}$ represents the mean value of the k-th layer regression vector.

4.2.4 Prediction Output Implementation

After multiple layers are superimposed, each layer is used to reduce the residual of the previous layer. Finally, the SDFR-ref model can be expressed as:

$$F^{SDFR-ref}(x^{Sel}) = \sum_{k=1}^{K} f_k^{SDFR}(\cdot) = \alpha \sum_{k=1}^{K} \sum_{t=1}^{T} [c_{1,l}^{CART}, \ldots, c_{T,l}^{CART}] I_R(x^{Sel}) \tag{22}$$

Among them, $I_R(x^{Sel})$ means $I_R(x^{Sel})=1$ when $x^{Sel} \in R$, and $I_R(x^{Sel})=0$ when $x^{Sel} \notin R$.

Since $F^{SDFR-ref}(\cdot)$ is calculated based on addition, the final predicted value cannot be simply averaged. Therefore, it is necessary to first calculate the mean value of the regression vector of each layer. Taking layer 1 as an example, it is as follows:

$$\begin{aligned}\hat{y}_1^{add} &= \frac{1}{T} \sum_{t=1}^{T} \hat{y}_1^{Regvec} \\ &= \frac{1}{T} \sum_{t=1}^{T} [h_1^{CART}(\cdot), \ldots, h_T^{CART}(\cdot)] \\ &= \frac{1}{T} \sum_{t=1}^{T} [c_{1,l}^{CART}, \ldots, c_{T,l}^{CART}]\end{aligned} \tag{23}$$

Add K predicted values to get the final predicted value, as shown below:

$$\hat{y} = \frac{1}{N} \sum_{n=1}^{N} y_n + \alpha \frac{1}{T} \sum_{k=1}^{K} \sum_{t=1}^{T} [c_{1,l}^{CART}, \ldots, c_{T,l}^{CART}] I_{R^{M \times N}}(X^{Sel}) \tag{24}$$

Among them, ŷ is the predicted value of SDFR-ref model; means $I_R(x^{Sel})=1$ when $x^{Sel} \in R$, and $I_R(x^{Sel})=0$ when. $x^{Sel} \notin R$

EMBODIMENTS

Figure 1:
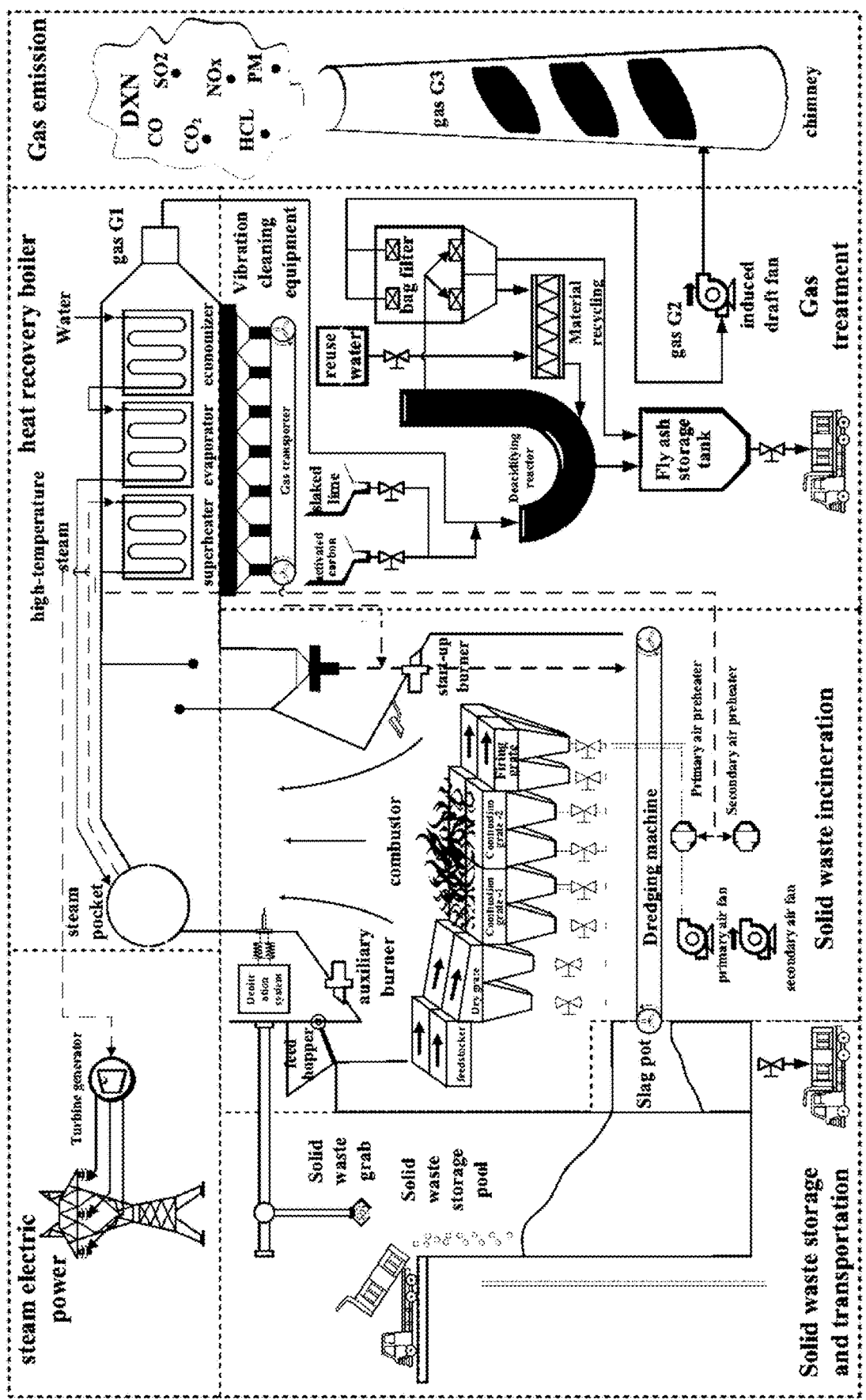
FIG. 1 is the typical process flow of MSWI based on grate furnace.
Figure 2:
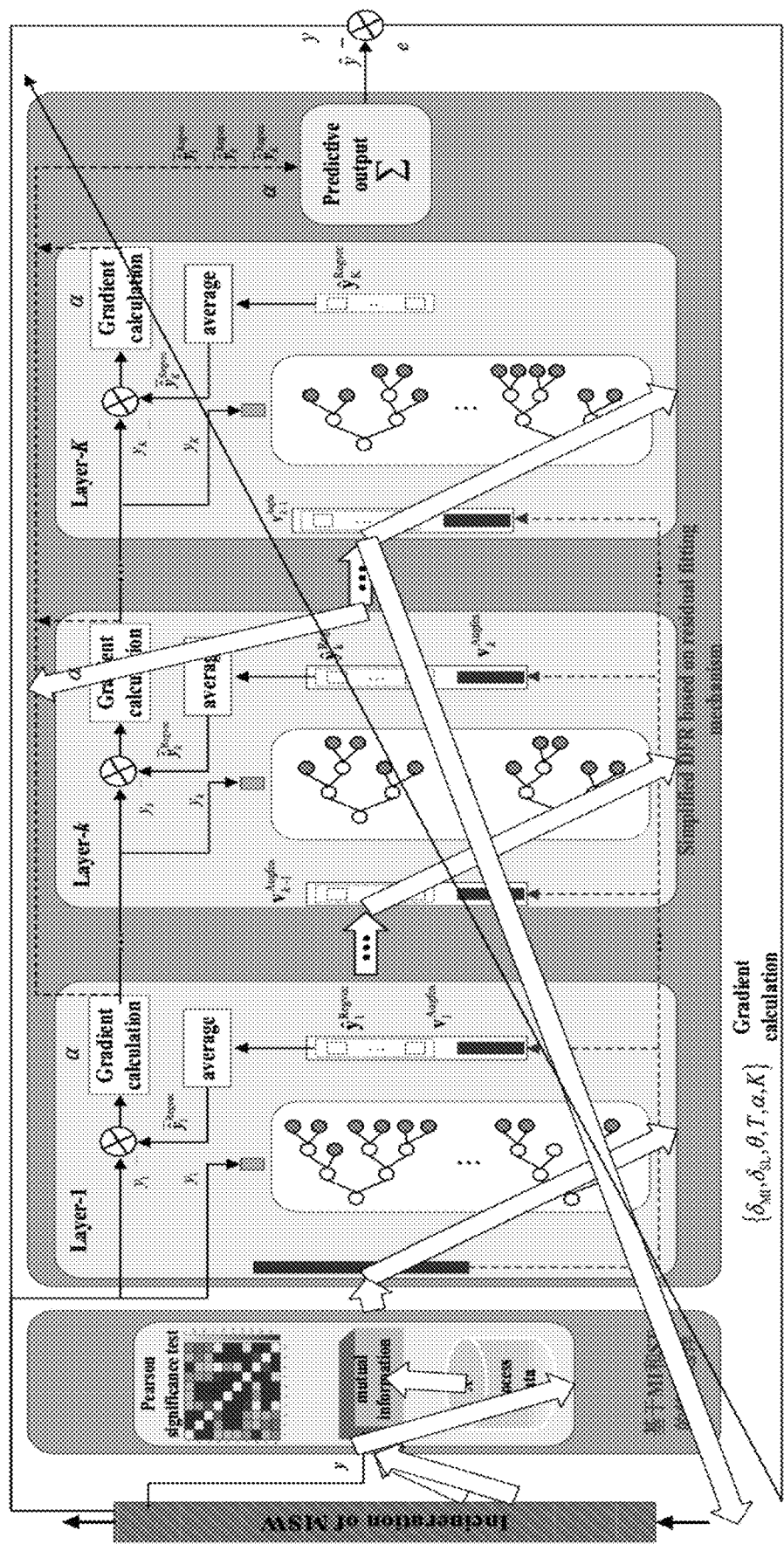
FIG. 2 is the modeling strategy proposed in the invention.

This embodiment uses a real DXN data set to verify the effectiveness of the proposed method. The DXN data comes from the actual MSWI process of an incineration plant in Beijing in the past 12 years, including 141 samples and 116 process variables. The process variables cover the four stages of MSWI, namely solid waste incineration, waste heat boiler, flue gas purification and flue gas emission, and Table 1 shows the detailed information.

TABLE 1 type of the procedure variable

| procedure variable | stage | | | |
|---|---|---|---|---|
| | solid waste incineration | waste heat boiler | flue gas treatment | flue gas emission |
| Temperature | 42 | 5 | 6 | / |
| Velocity | 18 | / | / | / |
| Flux | 15 | 5 | 6 | / |
| Pressure | 2 | 7 | / | / |
| Liquid level | / | 1 | / | / |
| Concentration | / | / | 1 | 8 |
| Total | 77 | 18 | 13 | 8 |
| | 116 | | | |

The sample sizes of the training, validation and test sets are respectively ½, ¼ and ¼ of the original sample data.

TABLE 2

Abbreviations of procedure variables

| Stage | procedure variables | uint | Abbreviations |
|---|---|---|---|
| solid waste incineration | combustion temperature 1 | ° C. | T1 |
| | combustion temperature 2 | ° C. | T2 |
| | combustion temperature 3 | ° C. | T3 |
| | maximum temperature at which a grate burns | ° C. | T4 |
| | temperature if the dry grate left inlet | ° C. | T5 |
| | temperature if the dry grate right inlet | ° C. | T6 |
| | temperature in the left side of the drying and burning sections of inner grate wall | ° C. | T7 |
| | temperature in the left side of the drying and burning sections of outer grate wall | ° C. | T8 |
| | temperature in the right side of the drying and burning sections of inner grate wall | ° C. | T9 |
| | temperature in the right side of the drying and burning sections of outer grate wall | ° C. | T10 |
| | left inner temperature of combustion grate 1-1 | ° C. | T11 |
| | left outer temperature of combustion grate 1-1 | ° C. | T12 |
| | right inner temperature of combustion grate 1-1 | ° C. | T13 |

TABLE 2-continued

Abbreviations of procedure variables

| Stage | procedure variables | uint | Abbreviations |
|---|---|---|---|
| | right outer temperature of combustion grate 1-1 | ° C. | T14 |
| | left inner temperature of combustion grate 1-2 | ° C. | T15 |
| | left outer temperature of combustion grate 1-2 | ° C. | T16 |
| | left inner temperature of combustion grate 2-1 | ° C. | T17 |
| | left outer temperature of combustion grate 2-1 | ° C. | T18 |
| | Outlet air temperature of primary air preheater | ° C. | T19 |
| | air temperature of the combustion grate inlet | ° C. | T20 |
| | temperature of cooling air outlet | ° C. | T21 |
| flue gas purification | temperature of fluidization fan outlet | ° C. | T22 |
| solid waste incineration | air flux of the left combustion grate | km3N/h | LAF1 |
| waste heat boiler | cooling water flux of the secondary superheater | t/h | CWF1 |
| flue gas treatment | supply flux of urea solvent | L/h | FUS1 |
| | Bag pressure difference | kPa | BP1 |
| flue gas purification | $O_2$ concentration of CEMS system | % | OC1 |
| | Dust concentration of CEMS system | mg/m3N | DC1 |
| | HCL concentration of CEMS system | mg/m3N | HC1 |
| | $CO_2$ concentration of CEMS system | % | CC1 |

First calculate the MI value between the 116 process variables and the DXN emission concentration. The invention sets the threshold value $\delta_{X_{Sel}}$ of MI=0.75 to ensure that the amount of information between the selected process variable and the DXN emission is as large as possible, the initial number of features selected is 30; Further, the significance level is set $\delta_{SL}$=0.1 and the final selected process variable are T2, T4, T5, T6, T7, T9, T10, T16, T20, T21, LAF1, FUS1, DC1 and CC1, 14 in total. The linear correlation between the selected process variables is weak, which demonstrates the effectiveness of the method used.

In this embodiment, the hyperparameters of SDFR-ref are empirically set as follows: the minimum number of samples is 3, the number of random feature selections is 11, the number of CARTs is 500, the number of layers is 500, and the learning rate is 0.1. RF, BP neural network (BPNN), XGBoost, DFR, DFR-clfc and ImDFR modeling methods are used for experimental comparison. The parameter settings are as follows: 1) RF: the minimum number of samples is 3, the number of CART is 500, and the random feature selection is 11; 2) BPNN: The number of hidden layer neurons is 30, the convergence error is 0.01, the algebra is 1500, and the learning rate is 0.1; 3) XGBoost: The minimum number of samples is 3, the number of XGBoost is 10, the regularization coefficient is 1.2, and the learning rate is 0.8; 4) DFR and DFR-clfc: the minimum number of samples is 3, the number of CART is 500, the number of random feature selection is 11, and the number of RF and CRF is 2 respectively.

The performance of the modeling method is evaluated using RMSE and $R^2$, which are defined as follows:

$$RMSE = \sqrt{\sum_{n=1}^{N}(y_n - \hat{y}_n)^2 / (N-1)} \tag{25}$$

$$R^2 = 1 - \sum_{n=1}^{N}(y_n - \hat{y}_n)^2 / \sum_{n=1}^{N}(y_n - \bar{y})^2 \tag{26}$$

Among them, $y_n$ represents the n-th true value, $\hat{y}_n$ represents the n-th predicted value, $\bar{y}$ represents the average output value, and N represents the number of samples.

On this basis, 30 repeated experiments were conducted on seven methods, and Table 3 shows the statistical results. Table 4 gives the statistical results of training time.

TABLE 3 statistical results

| Method | set | RMSE mean value | RMSE variance | RMSE optimum value | $R^2$ mean value | $R^2$ variance | $R^2$ optimum value |
|---|---|---|---|---|---|---|---|
| RF | training | 1.0993E−02 | 2.5498E−08 | 1.0704E−02 | 8.5783E−01 | 1.7106E−05 | 8.6522E−01 |
| | Validation | 1.9794E−02 | 3.9919E−08 | 1.9471E−02 | 5.1479E−01 | 9.6301E−05 | 5.3056E−01 |
| | Test | 1.6775E−02 | 6.1264E−08 | 1.6349E−02 | 5.9723E−01 | 1.4143E−04 | 6.1750E−01 |
| BPNN | training | 3.0495E−03 | 6.5539E−07 | 2.8748E−03 | 9.8832E−01 | 9.5015E−05 | 9.9028E−01 |
| | Validation | 3.2603E−02 | 2.4818E−04 | 2.1896E−02 | −6.1325E−01 | 4.0544E+00 | 4.0635E−01 |
| | Test | 3.1648E−02 | 2.1475E−04 | 1.8531E−02 | −7.3037E−01 | 3.3001E+00 | 5.0856E−01 |
| XGBoost | training | 1.0125E−02 | 0.0000E+00 | 1.0125E−02 | 8.7942E−01 | 3.1877E−31 | 8.7942E−01 |
| | Validation | 2.5207E−02 | 1.2452E−35 | 2.5207E−02 | 2.1325E−01 | 1.9923E−32 | 2.1325E−01 |
| | Test | 1.9748E−02 | 1.2452E−35 | 1.9748E−02 | 4.4189E−01 | 5.1004E−32 | 4.4189E−01 |
| DFR | training | 1.1508E−02 | 7.8541E−09 | 1.1347E−02 | 8.4422E−01 | 5.7639E−06 | 8.4855E−01 |
| | Validation | 2.0654E−02 | 1.0405E−08 | 2.0463E−02 | 4.7175E−01 | 2.7248E−05 | 4.8151E−01 |
| | Test | 1.7762E−02 | 1.6786E−08 | 1.7558E−02 | 5.4852E−01 | 4.3515E−05 | 5.5883E−01 |

TABLE 3-continued statistical results

| Method | set | RMSE | | | $R^2$ | | |
| --- | --- | --- | --- | --- | --- | --- | --- |
| | | mean value | variance | optimum value | mean value | variance | optimum value |
| DFR-clfc | training | 7.9183E–03 | 1.7761E–06 | 5.5822E–03 | 9.2423E–01 | 6.7227E–04 | 9.6335E–01 |
| | Validation | 2.0084E–02 | 1.4533E–07 | 1.9410E–02 | 5.0034E–01 | 3.6156E–04 | 5.3348E–01 |
| | Test | 1.6968E–02 | 9.9144E–08 | 1.6430E–02 | 5.8785E–01 | 2.3681E–04 | 6.1370E–01 |
| ImDFR | training | 7.7000E–03 | / | / | 9.2420E–01 | / | / |
| | Validation | 2.3700E–02 | / | / | 1.3120E–01 | / | / |
| | Test | 1.7900E–02 | / | / | 6.6360E–01 | / | / |
| SDFR-ref | training | 6.6200E–04 | 4.7281E–09 | 5.2456E–04 | 9.9950E–01 | 1.2323E–08 | 9.9970E–01 |
| | Validation | 2.1700E–02 | 6.9600E–07 | 2.0200E–02 | 4.1450E–01 | 2.1000E–03 | 4.9700E–01 |
| | Test | 1.4500E–02 | 6.5875E–07 | 1.3100E–02 | 6.9780E–01 | 1.2000E–03 | 7.5300E–01 |

TABLE 4 the statistical results of training time

| | Time | | |
| --- | --- | --- | --- |
| Method | mean value | variance | optimum value |
| RF | 5.4138E+01 | 6.2333E–01 | 5.3153E+01 |
| XGBoost | 9.7248E+01 | 3.5522E–01 | 9.6595E+01 |
| DFR | 4.8513E+02 | 2.2753E+04 | 2.3745E+02 |
| DFR-clfc | 8.2871E+02 | 1.0154E+05 | 3.4013E+02 |
| SDFR-ref | 3.7039E+01 | 1.5538E+00 | 3.4474E+01 |

It can be seen from Table 3: 1) In the training set, the proposed method SDFR-ref has the average (6.6200E–04 and 9.9950E–01) and the best values (5.2456E–04 and 9.9970E–01) of RMSE and $R^2$ has optimal results; since no randomness is introduced, the variance statistics of XGBoost is almost 0; 2) In the validation set, SDFR-ref has no obvious advantage, and its performance is only better than BPNN, XGBoost and ImDFR; RF, DFR and The generalization performance of DFR-clfc is almost the same; 3) In the test set, SDFR-ref has the best measurement accuracy (1.4500E–02) and fitting performance (6.9780E–01).

To sum up, SDFR-ref has more powerful learning capabilities compared with classic learning methods (RF, BPNN and XGBoost). In addition, SDFR-ref contrasts deep learning methods (DFR, DFR-clfc, ImDFR) to further enhance the implementation of the model based on the simplified forest algorithm. The performance of SDFR-ref in the test set also shows that its generalization ability is stronger than other methods. Therefore, the proposed method is effective for DXN prediction of MSWI processes.

Table 4 shows that the method proposed in the invention has a greater advantage in the average training time compared with the method that is also a decision tree.

The invention proposes a method based on SDFR-ref to predict the DXN emission concentration in the MSWI process based on the grate furnace. The main contributions are as follows: 1) The feature selection module based on mutual information and significance test effectively reduces the computational complexity and improves the prediction performance; 2) The decision tree is used instead of the forest algorithm in the deep integration structure, which has excellent training speed and learning ability. For DFR and DFR clfc; 3) Due to the introduction of residual fitting, the prediction accuracy of SDFR-ref is further improved. Experimental results show that compared with traditional ensemble learning and deep ensemble learning, SDFR-ref has better modeling accuracy and generalization performance, and the training cost is lower than the state-of-the-art ensemble models. Therefore, SDFR-ref is easier for practical applications.

What is claimed is:

1. A soft measurement method for dioxin emission of grate furnace MSWI process based on simplified deep forest regression of residual fitting mechanism, comprising:

a feature selection module based on Mutual information (MI) and significance test (ST) and a simplified deep forest regression (SDFR) module based on the residual fitting mechanism; wherein the feature selection module selects corresponding features by calculating MI value and ST value of each feature; for the SDFR module, Layer-k represents a k-th layer model, $\hat{y}_1^{Regvoc}$ represents an output vector of a first layer model, $v_1^{Augfea}$ represents augmented regression vector of a second layer input, $\bar{y}_k^{Regvoc}$ represents an average value of $\hat{y}_k^{Regvoc}$, $\alpha$ is a remaining learning rate between each layer; x and respectively represents process data before and after feature selection; y, $\hat{y}$ and e are a true value, predicted value and prediction error respectively;

in addition, $\{\delta_{MI}, \delta_{SL}, \theta, T, \alpha, K\}$ represents a learning parameter set of proposed SDFR-ref, where: $\delta_{MI}$ represents a threshold of MI, $\delta_{SL}$ represents a threshold of significance level, and $\theta$ represents a minimum sample in a leaf node number, T represents a number of decision trees in each layer of the model, a is the learning rate in a gradient boosting process, and K represents the number of layers; a globally optimized selection of these learning parameters being capable of improving synergy between different modules, thereby improving an overall performance of the model; wherein a proposed modeling strategy is formulated as solving the following optimization problem:

(1)

$$\min RMSE(F^{SDFR-ref}(\cdot)) = \sqrt{\frac{1}{N}\sum_{n=1}^{N}\left(\left(\frac{1}{N}\sum_{n=1}^{N}y_n + \alpha\frac{1}{T}\sum_{k=1}^{K}\sum_{t=1}^{T}[c_{1,l}^{CART}, \ldots, c_{T,l}^{CART}]_{I_{R^{M\times N}}}(X^{Xsel})\right) - y_n\right)^2}$$

-continued $$\text{s.t.} \begin{cases} X^{Xsel} = f_{FeaSel}(D, \delta_{MI}, \delta_{SL}) \\ 0 < \alpha \le 2 \\ 1 \le T \le 500 \\ 1 \le \theta \le N \\ 1 \le K \le 20 \\ 0 \le \delta_{MI} \le 1 \\ 0 \le \delta_{SL} \le 1 \end{cases} \quad (5)$$

wherein, $F^{SDFR\text{-}ref}(\bullet)$ represents the SDFR-ref model; $f_{FeaSel}(\bullet)$ represents a nonlinear feature selection algorithm proposed; N represents a number of modeling samples; $y_n$ represents an n-th true value; $c_{1,l}^{CART}$ represents predicted value of l-th leaf node of first CART, $C_{T,l}^{CART}$, represents predicted value of the I-th leaf node of T-th CART; $D=\{X,y|X\in R^{N\times M}, y\in R^{N\times 1}\}$ represents an original modeling data and an input of the feature selection algorithm, M is a number of original features; $I_{R^{M\times N}}(X^{Xsel})$ is an indicator function, wherein when $X^{Xsel}\in R^{M\times N}$, then $I_{R^{M\times N}}(X^{Xsel})=1$, when $X^{Xsel}\notin R^{M\times N}$, then $I_{R^{M\times N}}(X^{Xsel})=0$;

Feature selection based on MI and ST;

wherein MI and ST are used to calculate an information correlation between the original features and dioxins (DXN) values, and achieve a best selection of features through preset thresholds;

wherein for an input data set, the nonlinear feature selection algorithm $f_{FeaSel}(\bullet)$ proposed is defined as follows:

$$D^{Sel} = f_{FeaSel}(D, \delta_{MI}, \delta_{SL}) \quad (2)$$

wherein, $D^{Sel}=\{X^{Sel},y|X\in R^{N\times M^{Sel}}, y\in R^{N\times 1}\}$ respectively represent an output of a proposed feature selection algorithm, and $M^{Sel}$ is a number of selected features;

wherein MI provides an information quantification measure of a degree of statistical dependence between random variables, and estimates a degree of interdependence between two random variables to express shared information, with a calculation process as follows:

$$I_i^{MI}(x_i, y) = \sum_{x_{n,i}}\sum_{y_n} p(x_{n,i}, y_n)\log_2 \frac{p(x_{n,i}, y_n)}{p(x_{n,i}), p(y_n)} \quad (3)$$

wherein, $x_i$ is an i-th eigenvector of x, $x_{n,i}$ is a n-th value of an i-th vector, y represents a joint probability density; $p(x_{n,i})$ and $p(y_n)$ represent a marginal probability density of $x_{n,i}$ and $y_n$;

wherein when a MI value of a feature is greater than the threshold $\delta_{MI}$, the MI value is assigned as an important feature constituting a preliminary feature set $X^{MI}$; ST is used to analyze a correlation between the selected features based on MI and remove collinear features;

a Pearson coefficient value PCoe between the selected features $x_i^{MI}$ and $x_j^{MI}$ is calculated as follows:

$$PCoe = \frac{\sum_{n=1}^{N}(x_{n,i}^{MI} - \bar{x}_i^{MI})(x_{n,j}^{MI} - \bar{x}_j^{MI})}{\left\{\sum_{n=1}^{N}(x_{n,j}^{MI} - \bar{x}_i^{MI})^2 \sum_{n=1}^{N}(x_{n,j}^{MI} - \bar{x}_j^{MI})^2\right\}^{1/2}} \quad (4)$$

wherein, $\bar{x}_i^{MI}$ and $\bar{x}_j^{MI}$ represent an average value of $x_i^{MI}$ and $x_j^{MI}$ respectively, $x_{n,i}^{MI}$ and $x_{n,j}^{MI}$ represent a n-th value of $x_i^{MI}$ and $x_j^{MI}$; Z-test is used to calculate the $z_{test}$ value between features $x_i^{MI}$ and $x_j^{MI}$:

$$z_{test} = \frac{\bar{x}_i^{MI} - \bar{x}_j^{MI}}{\sqrt{S_i^2/N_i + S_j^2/N_j}} \quad (5)$$

wherein, $S_i$ and $S_j$ represent a standard deviation of $x_i^{MI}$ and $x_j^{MI}$; $N_i$ and $N_j$ represent a number of samples of $x_i^{MI}$ and $x_j^{MI}$;

wherein, a p-value is obtained by looking up a $z_{test}$ value in a table; wherein in $H_0$ it is presumed that there is no linear relationship between an i-th and j-th features, and the Pearson coefficient PCoe is regarded as an alternative hypothesis $H_1$; based on the comparison of p-value and significance level $\delta_{SL}$, a final selected $X^{Xsel}$ including preferred features is determined; wherein criteria are expressed as follows:

$$\begin{cases} \text{Accept } H_1 \text{ (linearly dependent)}, & p\text{-value} < \delta_{SL} \\ \text{reject } H_0 \text{ (linearly independent)} \\ \text{Accept } H_1 \text{ (linearly dependent)}, & p\text{-value} < \delta_{SL} \\ \text{reject } H_0 \text{ (linearly independent)} \end{cases} \quad (6)$$

wherein based on the above assumptions, collinear features selected by MI are removed, thereby reducing the impact of data noise on a training model;

wherein a training set after feature selection is recorded as $D^{Sel}$; an SDFR algorithm replaces a forest algorithm in the original DFR with a decision tree, that is, CART; each layer contains multiple decision trees, and tree nodes are divided using a squared error minimization criterion; a minimum loss function of this process is expressed as follows:

$$\text{Split}^{CART} = \min\left[\sum_{x_i^{Xsel}\in R_{Left}}(y_{Left} - c_{Left}^{CART})^2 + \sum_{x_i^{Xsel}\in R_{Right}}(y_{Right} - c_{Right}^{CART})^2\right] \quad (7)$$

wherein, $c_{Left}^{CART}$ and $c_{Right}^{CART}$ are the outputs of $R_{Left}$ and $R_{Right}$ nodes respectively; $y_{Left}$ and $y_{Right}$ represent a true values in $R_{Left}$ and $R_{Right}$ nodes respectively;

specifically, the nodes are determined in the following way:

$$\begin{cases} R_{Left}(j, s) = \{x^{Sel} | x_j^{Sel} \le s\} \\ R_{Right}(j, s) = \{x^{Sel} | x_j^{Sel} > s\} \end{cases} \quad (8)$$

wherein, j and S represent segmentation features and segmentation values respectively; $x_j^{Sel}$ is a j-th eigenvalue of the selected feature $x^{Sel}$; therefore, CART can be expressed as:

$$h_1^{CART}(x^{Sel}) = \sum_{l=1}^{L} c_l^{CART} I_{R_l^{CART}}(x^{Sel}) \quad (9)$$

wherein, L represents a number of CART leaf nodes, $c_l^{CART}$ represents an output of the l-th leaf node of CART, and $I_{R_l^{CART}}(x^{Sel})$ is the indicator function, when $x^{Sel} \in R_l^{CART}$, $I_{R_l^{CART}}(x^{Sel})=1$, when $x^{Sel} \notin R_l^{CART}$, $I_{R_l^{CART}}(x^{Sel})=0$;

a first-level model containing multiple CARTs is represented as follows:

$$f_1^{SDFR}(x^{Sel}) = \frac{1}{T}\sum_{t=1}^{T} h_{1,t}^{CART}(\cdot) \quad (10)$$

wherein, $f_1^{SDFR}(\cdot)$ represents the first layer model in SDFR, T represents a number of CARTs in each layer model, $h_{1,t}^{CART}(\cdot)$ represents a t-th CART model in layer 1;

wherein, a first-layer regression vector $\hat{y}_1^{Regvec}$ from a first-layer model $f_1^{SDFR}(\cdot)$ is expressed as follows:

$$\hat{y}_1^{Regvec} = [h_{1,1}^{CART}(\cdot), \ldots, h_{1,T}^{CART}(\cdot)] = [c_{1,l}^{CART}, \ldots, c_{T,l}^{CART}] \quad (11)$$

wherein, $c_{1,l}$ CART represents the predicted value of the l-th leaf node of the first CART, $C_{T,l}^{CART}$ represents the predicted value of the l-th leaf node of the T-th CART;

the augmented regression vector $v_1^{Augfea}$ is obtained by merging a layer regression vectors $\hat{y}_1^{Regvec}$ and is expressed as follows:

$$v_1^{Augfea} = f_{FeaCom}^1(\hat{y}_1^{Regvec}, x^{Sel}) \quad (12)$$

wherein, $f_{FeaCom}^1(\cdot)$ represents an eigenvector combination function;

$v_1^{Augfea}$ is then used as a feature input for a next layer; a DXN true value is no longer used in subsequent cascade modules, but a new true value is recalculated through a gradient boosting strategy; Therefore, the following formula is used to calculate a loss function of the squared error:

$$L_1^{SDFR}(y_n^{(1)}, f_1^{SDFR}(\cdot)_n) = \frac{1}{2}\sum_{i=1}^{N}(y_n^{(1)} - f_1^{SDFR}(\cdot)_n)^2 \quad (13)$$

wherein, $L_1^{SDFR}(\cdot)$ represents the squared error loss function in SDFR-ref; $y_n^{(1)}$ represents an n-th true value of a first layer training set;

the loss function $L_1^{SDFR}$ is further used to calculate a gradient direction as shown below;

$$\sigma_{1,n}^{SDFR} = -\left[\frac{\partial L(y_n^{(1)}, f_1^{SDFR}(\cdot))}{\partial f_1^{SDFR}(\cdot)}\right]_{f_1^{SDFR}(\cdot) = f_0^{SDFR}(\cdot)} \quad (14)$$

wherein, $\sigma_{1,n}^{SDFR}$ is the gradient of the n-th true value of layer 1; $f_0^{SDFR}(\cdot)$ represents an arithmetic mean of an initial true value, that is $$f_0^{SDFR}(\cdot) = \frac{1}{N}\sum_{n=1}^{N} y_n,$$

$y_n$ represents the n-th true value;
wherein, an objective function is:

$$f_1^{SDFR}(x^{Sel}) = f_0^{SDFR}(\cdot) + \alpha \sum_{t=1}^{T} [c_{1,l}^{CART}, \ldots, c_{T,l}^{CART}] I_R(x^{Sel}) \quad (15)$$

wherein, $f_1^{SDFR}(\cdot)$ is the first layer model; $\alpha$ represents the learning rate; $I_R(x^{Sel})$ represents when $x^{Sel} \in R$, $I_R(x^{Sel})=1$, when $x^{Sel} \notin R$, $I_R(x^{Sel})=0$;
therefore, a true value of a second level is:

$$\begin{aligned} y_2 &= \\ y - f_0^{SDFR}(\cdot) &- \alpha f_1^{SDFR}(\cdot) = y_1 - \alpha f_1^{SDFR}(\cdot) = y_1 - \alpha \bar{\hat{y}}_1^{Regvec} \end{aligned} \quad (16)$$

wherein, $y_1$ is a true value of the first layer model, that is, $y_1=y$, y is a true value vector of DXN; $\bar{\hat{y}}_1^{Regvec}$ represents a mean value of the first layer regression vector;
the training set of a k-th layer based on an augmented regression vector of a (k−1)-th layer is expressed as $D_k^{Sel}=\{\{v_{(k-1),n}^{Augfea}\}_{n=1}^N, y_k\}$, $v_{(k-1)}^{Augfea}$ is the augmented regression vector of the (k−1)-th layer, and $y_k$ is a k-th true value;
first, establish a k-th level decision tree $h_k^{CART}(\cdot)$ according to formulas (7) and (8); A k-th level model is expressed as follows:

$$f_k^{SDFR}(v_{(k-1),i}^{Augfea}) = \frac{1}{T}\sum_{t=1}^{T} h_{k,t}^{CART}(\cdot) \quad (17)$$

wherein, $f_k^{SDFR}(\cdot)$ represents the k-th layer model, and $h_{k,t}^{CART}(\cdot)$ represents a k-th layer of the t-th CART model;
then, the augmented regression vector $v_k^{Augfea}$ of the k-th layer is expressed as follows:

$$v_k^{Augfea} = f_{FeaCom}^k(\hat{y}_k^{Regvec}, x^{Sel}) \quad (18)$$

wherein, $\hat{y}_k^{Regvec}$ represents the regression vector of the k-th layer, that is, $\hat{y}_k^{Regvec}=[h_{k,1}^{CART}(\cdot), \ldots, h_{k,T}^{CART}(\cdot)]$;
then, calculate the gradient $\sigma_k^{SDFR}$ according to formulas (12) and (13); A true value of (k+1)-th layer is expressed as follows:

$$y_{k+1} = y_1 - \alpha(\bar{\hat{y}}_1^{Regvec} + \ldots + \bar{\hat{y}}_k^{Regvec}) \quad (19)$$

the K-th layer is a last layer of an SDFR-ref training process, that is, the preset maximum number of layers, and its training set is $D_K^{Sel}=\{\{v_{(K-1),n}^{Augfea}\}_{n=1}^N, y_K\}$; first, build a decision tree model $h_K^{CART}(\cdot)$ through the training set $D_K^{Sel}$ and further obtain the K-th layer model $f_K^{SDFR}(\cdot)$; Then, calculate the K-th layer regression vector $\hat{y}_K^{Regvec}$ according to an input augmented regression vector $v_{(K-1)}^{Augfea}$, which is expressed as follows:

$$\hat{y}_K^{Regvec} = [h_{K,1}^{CART}(\cdot), \ldots, h_{K,T}^{CART}(\cdot)] \quad (20)$$

wherein, $h_{K,1}^{CART}(\cdot)$ represents the first CART model of the K-th layer, $h_{K,T}^{CART}(\cdot)$ represents a T-th CART model of the K-th layer;

finally, output value after gradient boosting with learning rate $\alpha$ is:

$$y_k = y_1 - \alpha \sum_{k=1}^{(K-1)} \overline{\hat{y}}_k^{Regvec} \quad (21)$$

wherein, $\overline{\hat{y}}_k^{Regvec}$ represents a mean value of the k-th layer regression vector;

after multiple layers are superimposed, each layer is used to reduce a residual of previous layer; finally, an SDFR-ref model can be expressed as:

$$F^{SDFR-ref}(x^{Sel}) = \sum_{k=1}^{K} f_k^{SDFR}(\cdot) = \alpha \sum_{k=1}^{K} \sum_{t=1}^{T} [c_{1,l}^{CART}, \ldots, c_{T,l}^{CART}] I_R(x^{Sel}) \quad (22)$$

wherein, $I_R(x^{Sel})$ means $I_R(x^{Sel})=1$ when $x^{Sel} \in R$, and $I_R(x^{Sel})=0$ when $x_{Sel} \notin R$;

wherein $F^{SDFR-ref}(\cdot)$ is calculated based on addition, a final predicted value is not simply averaged; and first calculate a mean value of the regression vector of each layer as follows, taking layer 1 as an example:

$$\hat{y}_1^{add} = \frac{1}{T} \sum_{t=1}^{T} \hat{y}_1^{Regvec} \quad (23)$$

$$= \frac{1}{T} \sum_{t=1}^{T} [h_1^{CART}(\cdot), \ldots, h_T^{CART}(\cdot)]$$

$$= \frac{1}{T} \sum_{t=1}^{T} [c_{1,l}^{CART}, \ldots, c_{T,l}^{CART}]$$

add K predicted values to get the final predicted value, as shown below:

$$\hat{y} = \frac{1}{N} \sum_{n=1}^{N} y_n + \alpha \sum_{k=1}^{K} \sum_{t=1}^{T} [c_{1,l}^{CART}, \ldots, c_{T,l}^{CART}] I_{R^{M \times N}}(X^{Sel}) \quad (24)$$

and wherein, $\hat{y}$ is a predicted value of SDFR-ref model; means $I_R(x^{Sel})=1$ when $x^{Sel} \in R$, and $I_R(x^{Sel})=0$ when $x^{Sel} \notin R$.

* * * * *